United States Patent [19]

Ulrich et al.

[11] 4,381,148

[45] Apr. 26, 1983

[54] POWER METER FOR HIGH ENERGY LASERS

[75] Inventors: Peter B. Ulrich, Oxon Hill, Md.; Gary L. Trusty; Daniel H. Leslie, both of Alexandria, Va.

[73] Assignee: The United States of America as represented by the Secretary of the Navy, Washington, D.C.

[21] Appl. No.: 246,350

[22] Filed: Mar. 23, 1981

[51] Int. Cl.³ .......................... G01J 1/04; G01J 1/42; G01K 17/00

[52] U.S. Cl. .................................. 356/213; 356/234; 374/32

[58] Field of Search ............... 356/213, 216, 217, 234, 356/432, 437, 246; 374/32–35; 250/343

[56] References Cited

U.S. PATENT DOCUMENTS

| | | | |
|---|---|---|---|
| 3,575,048 | 4/1971 | De Benedictis | 374/32 |
| 3,670,570 | 6/1972 | Briones | 374/32 |
| 3,783,685 | 1/1974 | Zeiders, Jr. et al. | 374/32 |
| 4,184,768 | 1/1980 | Murphy et al. | 356/217 |
| 4,187,026 | 2/1980 | Schaffer et al. | 356/326 |
| 4,234,258 | 11/1980 | Margolis et al. | 356/437 |
| 4,236,827 | 12/1980 | Horiba et al. | 356/437 |

Primary Examiner—Bruce Y. Arnold
Attorney, Agent, or Firm—Robert F. Beers; William T. Ellis; Alan P. Klein

[57] ABSTRACT

A power meter for non-destructively measuring the power of a high energy laser beam. The power meter includes a cell disposed in the flow path of a gas containing a laser radiation-absorbing species. The absorption coefficient of the absorbing species is small enough to allow the beam to pass through the cell essentially unaltered. The concentration of the absorbing species is modulated to modulate its absorption of the laser beam power and produce acoustic waves in the gas which can be detected and measured to give an absolute measurement of the power in the high energy laser beam.

10 Claims, 1 Drawing Figure

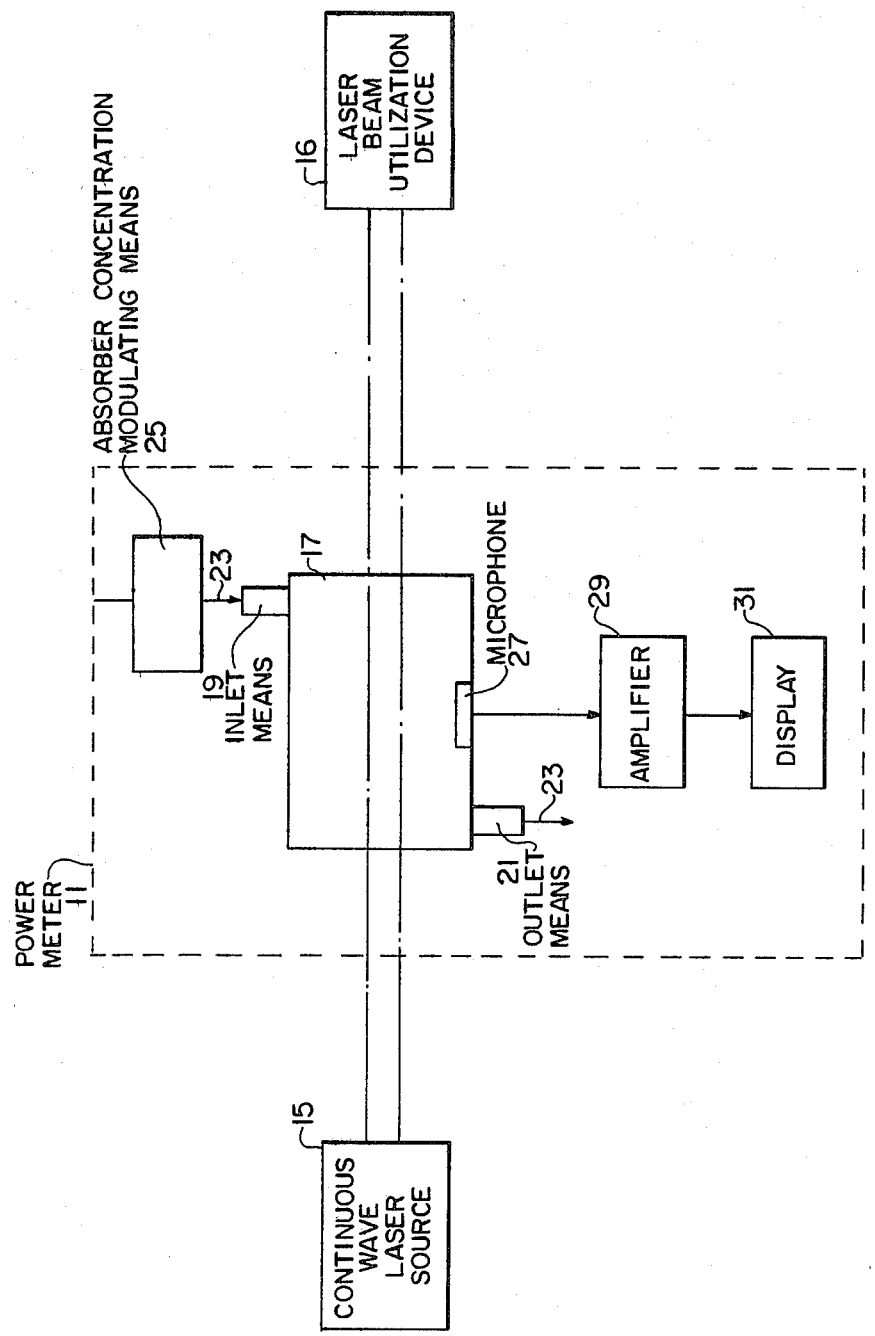

POWER METER FOR HIGH ENERGY LASERS

BACKGROUND OF THE INVENTION

This invention relates generally to a power-measuring system, and more particularly to power-measuring systems for high energy lasers.

The output power of a high energy laser is of great interest for diagnostic and task assessment purposes. Its measurement also presents the system designer with some unique difficulties. In the conventional method, the beam is directed into a calorimeter in which laser power is converted to a measurable rise in temperature. This redirection and ultimate destruction of the beam precludes its use for any other purpose during the time the power measurement is made. In addition, a significant proportion of run time, and hence laser fuel cost, is devoted to this single power measurement.

SUMMARY OF THE INVENTION

It is therefore an object of the present invention to non-destructively measure the power of a high energy laser beam.

Another object is to provide a system for accurately and efficiently measuring the power of a high energy laser beam without redirecting and ultimately destroying the beam.

A further object is to provide such a system which is of low cost to build, maintain, and operate.

The objects of the present invention are achieved by a power meter which comprises a cell adapted to be aligned with respect to a laser source whose beam power is to be measured so as to pass its beam. The cell includes inlet means for transporting a gas containing laser radiation-absorbing species into the cell, means for detecting repeated thermal expansions and contractions of the gas in the cell caused by a modulated absorption of the laser beam power resulting from modulation of the absorbing species concentration, and outlet means for withdrawing the gas from the cell. There is further provided means which modulates the concentration of the radiation-absorbing species in the gas. The radiation-absorbing species has an absorption coefficient sufficiently small to allow the beam to pass through the power meter essentially unaltered and be used for other purposes during the time the power measurement is made. The strength of the expansions and contractions of the gas gives a measure of the power of the beam.

The invention provides a measurement apparatus and process which requires no beam deflection and hence is much more efficient of fuel expenditures. Furthermore, the new system has the potential for providing a continuous check of beam power throughout the entire run of the laser with a resolution typically of tens of Hertz. The full beam is used rather than just a small sample so that, after suitable calibration, it becomes a secondary absolute quantitative measurement. Finally, the envisioned system is capable of replication at a number of stations along the beam to provide real-time power history comparisons for post-test analysis and design evaluation.

Additional advantages and features will become more apparent as the subject invention becomes better understood by reference to the following detailed description when considered in connection with the accompanying drawing, wherein:

BRIEF DESCRIPTION OF THE DRAWING

The FIGURE shows a power meter in accordance with the invention.

DETAILED DESCRIPTION OF THE PREFERRED EMBODIMENT

Referring to the FIGURE, there is shown a power meter 11 for non-destructively measuring the power of a high energy laser beam. For illustrative purposes, the power meter 11 is shown positioned in the path of a beam 13 of radiation which is supplied from a high energy c.w. laser source 15 to a utilization device 16. The power meter 11 includes a cell 17 which is adapted to be aligned with respect to the laser source 15 so as to pass the beam 13. The cell has an inlet means 19 for transporting into the cell a gas containing a known laser radiation-absorbing species, and an outlet means 21 for withdrawing the gas from the cell. The gas is transported into and withdrawn from the cell at the same rate. The direction of the gas flow is indicated by the arrows 23. The presence of the laser radiation absorbing-species in the gas causes an absorption of laser power from the beam 13. The intensity of the absorption varies directly with the concentration of laser radiation-absorbing species in the gas flowing through the cell 17. Means, indicated generally by block 25, modulates the concentration of the laser radiation-absorbing species in the gas to cause a like modulation of the intensity of the power absorption. Such means may conveniently take a variety of forms within the skill of the art. By way of example, the modulating means 25 may be a rapid action valve through which molecules of the laser radiation-absorbing species are repeatedly injected into the flow path of the gas, or a flash lamp which is repeatedly pulsed to depopulate the absorbing energy transition, or an intense ultraviolet source which is repeatedly pulsed to dissociate the molecules of the radiation-absorbing species. Detecting means is associated with cell 17 for detecting the repeated thermal expansions and contractions of the gas that result from the modulation of the power absorption. While such means may take a variety of forms, it may take the form illustrated in the FIGURE of a microphone 27 located in the wall of the cell and coupled by an amplifier 29 to a display 31.

In operation, a gas containing a known laser radiation-absorbing species, that is to say one whose absorption coefficient is known, is transported into the cell 17, via the inlet means 19 at a constant rate and withdrawn from the cell via outlet means 21 at the same rate. Modulating means 25 modulates the concentration of the laser radiation-absorbing species in the gas within the cell 17. A laser radiation-absorbing species is selected having an absorption coefficient sufficiently small that when a beam 13 whose power is to be measured is passed through the cell 17, no significant reduction in the power of the beam occurs upon its emerging from the cell. Nevertheless, the power abstracted from the beam 13 by the laser radiation-absorbing species is sufficient to heat the gas in the cell 17 and, owing to the modulation of the concentration of the absorbing species, and, therefore, of the absorption, produce repeated thermal expansions and contractions of the gas within the cell 17, that is to say, acoustic waves. The acoustic waves modulate the amplitude of an electric current in microphone 27 and the output of the microphone is amplified by the amplifier 29 and presented on the display 31. The strength of the amplitude-modulation is directly proportional to the power of the beam 13. A calibration curve can be plotted prior to use of the power meter 11 by placing a standard calorimeter at its output and measuring, both with the standard calorimeter and with the power meter, the power of a set of reference beams transmitted through the cell 17. Once the power meter 11 is calibrated, the calorimeter is removed, and an absolute measurement of the power of a beam 13 whose power is not known is possible without interrupting the transmission of the beam to a utilization device 16.

Therefore, it is apparent that the disclosed power meter is an efficient device for making laser beam power measurements without redirecting and ultimately destroying the laser beam.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A power meter for non-destructively measuring the power of a beam from a high energy laser source, the power meter comprising:
   a cell adapted to be aligned with respect to the laser source to pass the beam and including inlet means for transporting a gas containing laser radiation-absorbing species into the cell, means for detecting repeated thermal expansions and contractions of the gas in the cell caused by a modulated absorption of laser power, and outlet means for withdrawing the gas from the cell; and
   means for modulating the concentration of the radiation-absorbing species in the gas.

2. The power meter recited in claim 1 wherein the detecting means includes:
   a microphone for modulating an electric current with the acoustic waves resulting from the repeated thermal expansions and contractions of the gas.

3. The power meter recited in claim 1 wherein the modulating means includes:
   a rapid-action valve for repeatedly injecting molecules of the radiation-absorbing species into the gas.

4. The power meter recited in claim 1 wherein the modulating means includes:
   a pulsed flash lamp for repeatedly reducing the population of the radiation-absorbing species in the ground state of the absorbing transition.

5. The power meter recited in claim 1 wherein the modulating means includes:
   an intense pulsed ultraviolet source for repeatedly dissociating the molecules of the radiation-absorbing species.

6. A method of non-destructively measuring the power of a beam from a high energy laser source, comprising the steps of:
   passing the beam through a cell;
   transporting a gas which contains laser radiation-absorbing species into the cell;
   modulating the concentration of the radiation-absorbing species in the gas;
   detecting repeated thermal expansions and contractions of the gas caused by a modulated absorption of laser power; and
   withdrawing the gas from the cell.

7. The method recited in claim 6 wherein the detecting step includes:
   modulating an electric current with the acoustic waves resulting from the repeated thermal expansions and contractions of the gas.

8. The method recited in claim 6 wherein the concentration-modulating step includes:
   repeatedly injecting molecules of the radiation-absorbing species into the gas.

9. The method recited in claim 6 wherein the concentration-modulating step includes:
   repeatedly reducing the population of the radiation-absorbing species in the ground state of the absorbing transition.

10. The method recited in claim 6 wherein the concentration-modulating step includes:
    repeatedly dissociating the molecules of the radiation-absorbing species.

* * * * *